Dec. 31, 1935. C. E. HATHORN 2,025,743
RETRACTABLE LANDING GEAR
Filed March 20, 1933
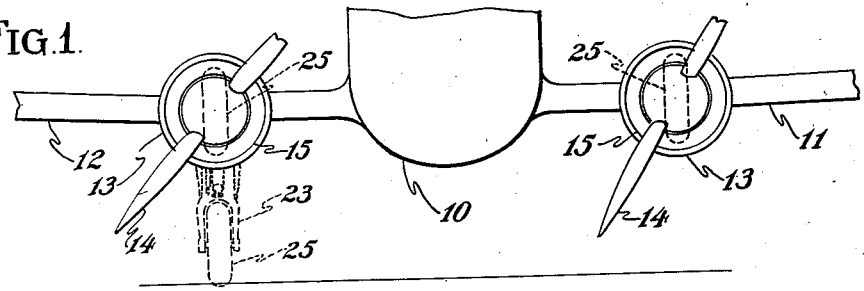
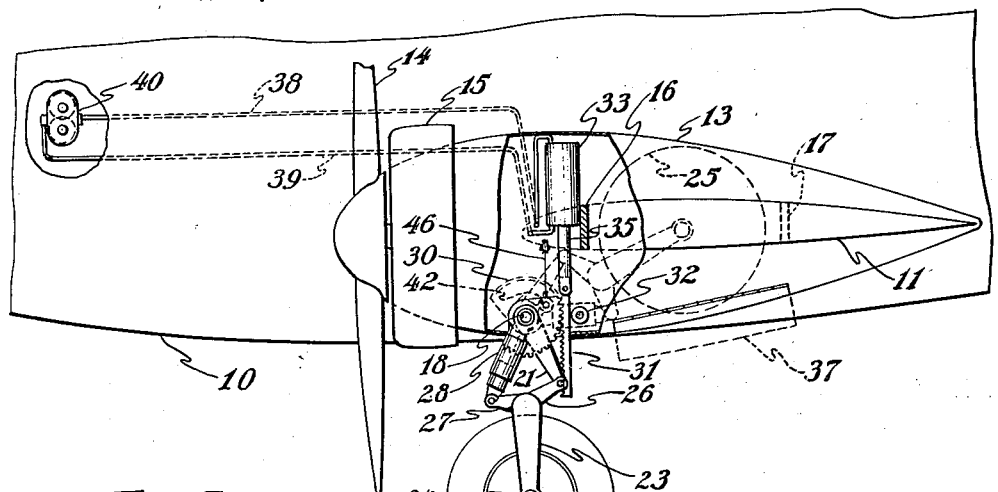
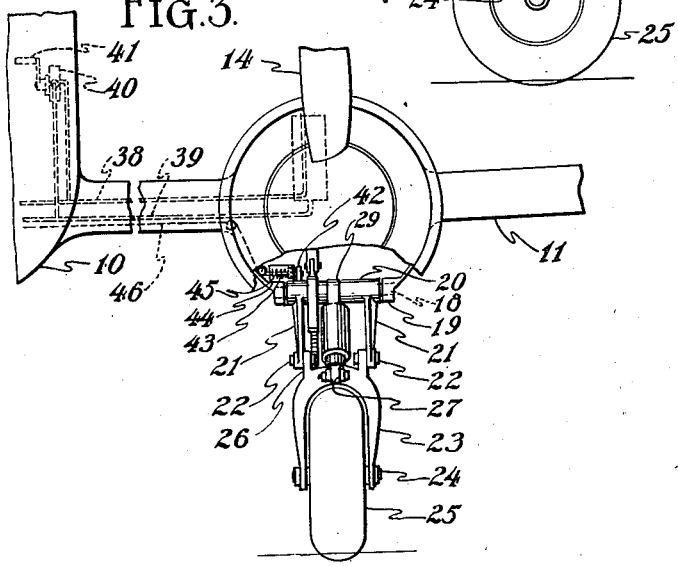
INVENTOR.
CHARLES E. HATHORN.
BY
ATTORNEYS.

Patented Dec. 31, 1935

2,025,743

UNITED STATES PATENT OFFICE 2,025,743

RETRACTABLE LANDING GEAR

Charles E. Hathorn, Hempstead, N. Y., assignor to Curtiss Aeroplane & Motor Company, a corporation of New York Application March 20, 1933, Serial No. 661,705

4 Claims. (Cl. 244—2)

This invention relates to improvements in retractable landing gears for aircraft.

An object of the invention is to provide a retractable landing gear which avoids the use of universal joints of all kinds, using only simple shafts and bearings.

A further object is to provide a landing gear adapted to be wholly retracted within an engine nacelle or body structure, so as to be wholly contained therein, avoiding projecting struts and the like when the gear is retracted.

A further object is to provide positive remote control means for raising and lowering the landing gear.

A further object is to provide means to positively lock the landing gear in an extended position.

Still another object is to provide a landing wheel which lies in a single plane with respect to the aircraft regardless of its position of retraction or extension. Corollary to the above object is the effect produced by the construction, wherein, upon landing with the landing gear inadvertently partially extended, little or no damage will result to the aircraft.

A further object is to provide a landing gear which is swingable about a single axis, avoiding the complication attendant to those types of retractable landing gears which use a plurality of struts and joints.

Preferably, the landing gear of my invention is adapted for use on that type of aircraft wherein motor nacelles are located in the lower wings. A single strong pivot axis is provided in the lower forward part of the nacelle, and on this axis, the wheel carrying mechanism is adapted to be swung to a position below the pivot for ground contact, and rearwardly to a retracted position within the engine nacelle and between the usual front and rear spars of the wing which supports the nacelle. The wheel carrying mechanism comprises a wheel fork having longitudinally spaced pivot axes immediately above the wheel. One such axis is connected to the main pivot axis in the nacelle by a rigid cantilever strut, while the other axis is connected to the main pivot axis by the usual form of telescoping shock absorber strut. A gear, concentric with the main pivot axis is mounted upon said rigid strut, and mechanism comprising a rack translatable by means of suitable mechanism such as a hydraulic mechanism, serves to turn the oleo strut, the rigid arm, and the wheel fork between the previously mentioned ground engaging and retracted positions.

Referring to the drawing, in which similar numbers indicate similar parts:

Fig. 1 is a partial front elevation of an airplane embodying the invention;

Fig. 2 is a partial side elevation of the airplane, partly broken away to show details of construction;

Fig. 3 is an enlarged portion of Fig. 1, partly broken away and showing a landing gear in the extended position; and Fig. 4 is a section of the hydraulic mechanism for extending and retracting the landing gear.

An airplane fuselage 10 is provided with conventional laterally extending wings 11 and 12, each of which has an engine nacelle 13 provided at its forward end with a conventional propeller 14, and an anti-drag cowling 15 within which the engine, not shown, is housed.

Referring to Fig. 2, the wing 11 is provided with a front spar 16 and a rear spar 17, these spars forming the structural bracing for the wing and serving as anchorages to which the nacelle 13 and associated parts are attached.

On the lower side of the nacelle 13, forward and below the spar 16, a pivot shaft 18 is rigidly carried as by bearings 19. Mounted on this shaft is a sleeve 20 having spaced rigid arms 21 extending outwardly therefrom. At the outer or lower ends of the arms 21 are aligned pivots 22 on which is mounted for oscillation a wheel fork 23 carrying a wheel axle 24 which in turn carries a ground contact wheel 25 for rotation. Referring to Fig. 2, it will be noted that the wheel fork 23 is provided with longitudinal members 26 which extend slightly rearwardly from the main body of the fork and which are connected by the pivots 22 to the arms 21. The fork 23 is also provided with a forwardly extending member 27, to the end of which is pivoted an oleo strut 28. The upper end of the strut 28 is borne for pivoting on the sleeve 20, as at 29. It will be noted that the axes of the sleeve 20, the pivots 22, the wheel axle 24 and the oleo strut pivot are all parallel and extend horizontally and laterally with relation to the longitudinal axis of the fuselage 10. With the arms 21 in a fixed position, the wheel fork 23 may oscillate about the pivots 22, such oscillation being limited by the action of the oleo strut 28.

A gear sector 30, the periphery of which is concentric with the pivot axis 18, is mounted rigidly on the sleeve 20. Engageable with the sector 30 is a rack 31, held against the sector gear by a suitable rigidly mounted roller such as 32. Within the engine nacelle is a cylinder 33 having a piston 34 slidable therein, said piston having a piston rod 35 extending through a suitable packing gland (not shown) in the bottom of the cylinder, the piston rod being joined as at 36 to the upper end of the rack 31. It will be seen that raising or lowering the piston 34 within the cylinder 33 translates the rack 31, rotating the sector gear 30 and swinging the wheel 25, the fork 23, the arms 21 and the oleo strut 28 between retracted and extended positions. Fig. 2, in solid lines, shows the position of the landing gear in its extended position, while the dotted lines of Fig. 2 indicate the position of the landing gear in its retracted position, the wheel 25 then occupying space within the nacelle 13 and between the front and rear spars 16 and 17 of the wing 11. A suitable trap door 37 is provided in the lower part of the nacelle, this door being adapted to close when the landing gear is retracted to provide a continuous streamline surface for the outer covering of the nacelle.

Remotely controllable means are provided for raising and lowering the piston 34 within the cylinder 33, comprising fluid lines 38 and 39 connecting the upper and lower ends, respectively, of the cylinder 33 with a gear type fluid pump 40 of conventional design. The pump is provided with a handle 41 for its actuation, or may be provided with conventional power means for driving it. It will be seen that rotation of the pump 40 in one direction will build up pressure in the line 39, entering the lower part of the cylinder 33 and forcing the piston, and hence the landing gear, toward a retracted position. Reverse operation of the pump 40 will impose a fluid pressure in the line 38, entering the top of the cylinder 33, and forcing the piston 34 downward, hence extending the landing gear. Suitable means may be provided for locking the handle 41 of the pump when either extreme position has been reached.

Additional means are provided to lock the landing gear when it has been moved to its extended or ground engaging position, since too much dependence should not be placed upon the fluid actuating mechanism to hold the landing gear when landing stresses are imposed thereon. To this end, an arm 42 is rigidly affixed to the sleeve 20, and is provided with an opening within which a bolt 43, slidable in a rigid bracket 44, may engage. The bolt 43 may be urged toward engagement with the arm 42 by a spring 45. A tension cable 46, attached at one end to the bolt and connected at its other end to a suitable ring or handle within reach of the aircraft crew is provided to withdraw the bolt when it is desired to retract the landing gear. The bolt 43 will engage automatically, under the influence of the spring 45, when the gear is extended.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft, a compartment, a pivot at the lower side thereof, an arm swingable forwardly and rearwardly about said pivot, a member pivoted to said arm, a wheel carried for rotation on said member, a shock absorbing mechanism connecting said member with said pivot, a device carried by said arm, and means engaging said device selectively operable to retract said member and said wheel within said compartment or to extend said member and said wheel therefrom.

2. In aircraft landing gear, a transverse pivot carried by the aircraft, an arm swingable about said pivot, a shock absorbing strut swingable on said pivot with and with respect to said arm, a substantially T-shaped member pivoted at its upper outer ends to the outer end of said shock absorber and of said arm, respectively, a wheel carried at the lower end of said T-shaped member, and means operatively connected with said arm for moving same, with said shock absorber, T-shaped member and wheel, to a retracted position within said aircraft.

3. In aircraft landing gear, a member having triangularly disposed pivots, one said pivot carrying a landing wheel, a shaft carried by said aircraft, an arm carried by said shaft and extending to a second of said member pivots, and a shock absorbing strut extending from said shaft to the third said member pivot.

4. In aircraft landing gear, a member having triangularly disposed pivots, one said pivot carrying a landing wheel, a shaft carried by said aircraft, an arm carried by said shaft and extending to a second of said member pivots, a shock absorbing strut extending from said shaft to the third said member pivot, and means connected to said arm for swinging said arm, with said member, said landing wheel and said shock absorber, about said shaft.

CHARLES E. HATHORN.